(12) United States Patent
Nagoya et al.

(10) Patent No.: US 6,580,181 B2
(45) Date of Patent: Jun. 17, 2003

(54) IN-VEHICLE KEY CHECK SYSTEM HAVING CHECK HISTORY MEMORY

(75) Inventors: Tatsuya Wakamatsu Nagoya, Nukata-gun (JP); Toshihiro Wakamatsu, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/940,571

(22) Filed: Aug. 29, 2001

(65) Prior Publication Data

US 2002/0030410 A1 Mar. 14, 2002

(30) Foreign Application Priority Data

Sep. 8, 2000 (JP) ........................................ 2000-273819

(51) Int. Cl.[7] .............................................. B60R 25/04
(52) U.S. Cl. ..................................... 307/10.5; 340/5.61
(58) Field of Search ............................... 307/10.2, 10.5; 340/5.26, 5.64, 5.611, 5.63, 505, 527, 528, 529

(56) References Cited

U.S. PATENT DOCUMENTS

| 4,965,460 A | | 10/1990 | Tanaka et al. |
| 5,519,376 A | * | 5/1996 | Iijima ........................ 180/287 |
| 5,640,057 A | | 6/1997 | Hirata et al. |
| 5,773,803 A | * | 6/1998 | Fukuta ........................ 235/375 |
| 5,883,444 A | | 3/1999 | Hirata et al. |
| 5,886,421 A | * | 3/1999 | Mizuno et al. .............. 180/287 |
| 6,025,653 A | * | 2/2000 | Hayashi et al. ................ 290/33 |
| 6,144,113 A | * | 11/2000 | Hayashi et al. .............. 180/287 |
| 6,285,948 B1 | * | 9/2001 | Takagi et al. ............... 307/10.5 |
| 6,400,254 B2 | * | 6/2002 | Yamamoto et al. ......... 307/10.3 |

FOREIGN PATENT DOCUMENTS

| JP | A-62-156486 | 7/1987 |
| JP | A-10-103209 | 4/1998 |
| JP | A-11-91507 | 4/1999 |

* cited by examiner

Primary Examiner—Brian Sircus
Assistant Examiner—Sharon A. Polk
(74) Attorney, Agent, or Firm—Posz & Bethards, PLC

(57) ABSTRACT

An in-vehicle key check system has a security ECU, a transmitter and a receiver for communication with a portable electronic key. The ECU communicates with the electronic key each time a key check condition is satisfied, and checks whether the electronic key is an authorized one based on response signals from the electronic key. The check result indicating that the electronic key is the authorized one is stored in a memory. This check result is erased when a predetermined time elapses or when the electronic key is likely to be taken out from the vehicle. When another check condition is satisfied, the ECU refers to the memory and skips the key check operation if the previous check result is stored in the memory.

11 Claims, 4 Drawing Sheets

IN-VEHICLE KEY CHECK SYSTEM HAVING CHECK HISTORY MEMORY

CROSS REFERENCE TO RELATED APPLICATION

This application is based on and incorporates herein by reference Japanese Patent Application No. 2000-273819 filed Sep. 8, 2000.

BACKGROUND OF THE INVENTION

The present invention relates to an in-vehicle key check system, which checks an electronic key in a vehicle by communication with the electronic key carried by a user.

Some vehicles have electronic key systems, so that vehicle doors are opened and closed automatically by communication between a portable transponder (electronic key) carried by a vehicle user and an electronic control unit installed in a vehicle (in-vehicle ECU). In these systems, the in-vehicle ECU transmits a wireless request signal toward a vehicle outside and the electronic key transmits a wireless response signal including its identification information stored therein, while the vehicle user with the electronic key is outside the vehicle within a specified area of the vehicle. The in-vehicle ECU checks the identification code in the response signal to enable and disable automatic door control based on the check result.

Other vehicles have different electronic key systems, so that a vehicle steering or a vehicle engine is rendered operative by communication between an electronic key and an in-vehicle ECU. In these systems, communication between the in-vehicle ECU and the electronic key is limited within an in-vehicle area, that is, within a vehicle compartment. The in-vehicle ECU also checks whether the electronic key is an authorized one to allow the steering operation or the engine operation.

In the in-vehicle key check operation, the electronic key transmits various identification codes, random numbers and the like in a plurality of time stages for an improved security. This operation requires several hundred milliseconds (ms) to complete one cycle. This operation is performed for each of various predetermined check conditions, thus increasing the check operation time. Thus, the steering or engine operation is disabled for a certain time immediately after a vehicle user gets into a vehicle.

SUMMARY OF THE INVENTION

It is therefore an object of the present invention to reduce in-vehicle key check operation time and processing of an in-vehicle electronic control unit.

According to the present invention, an in-vehicle check system for a vehicle comprises a transmitter, a receiver and an electronic unit installed in a vehicle for communication with a portable transponder carried by a user. The electronic unit checks whether the portable transponder is an authorized one based on wireless communication with the transponder in the vehicle. The electronic unit includes a memory for storing a check result indicating that the portable transponder is the authorized one, and checks the memory for the check result and eliminates another check operation when the check result is stored in the memory.

Preferably, the electronic unit communicates with the portable transponder through the wireless signals in a plurality of time-divided stages to complete one cycle of its checking operation. The electronic unit checks the memory for the check result each time a predetermined in-vehicle check condition is satisfied. The electronic unit erases the check result stored in the memory, when a predetermined condition indicating a possibility of taking out the portable transponder from the vehicle is detected or when a predetermined time elapses after the check result is stored in the memory.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with reference to an embodiment, which is directed to an electronic key system for a vehicle door open/close control or a vehicle engine start enable/disable control by an electronic key used as a portable transmitter/receiver (transponder). This system performs an electronic key check operation while the electronic key is outside and inside the vehicle.

Figure 1:
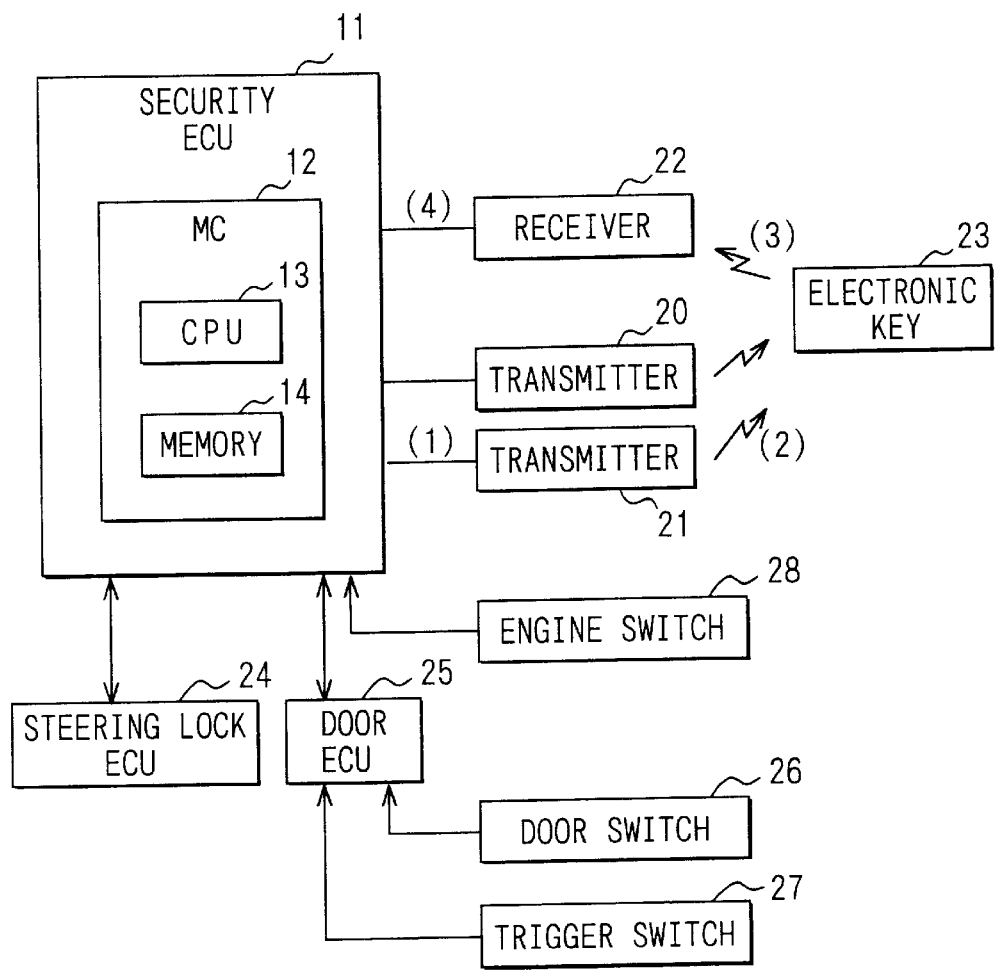
FIG. 1 is a block diagram showing a key check system according to an embodiment of the present invention.

Referring to FIG. 1, the electronic key system has an electronic control unit (ECU) 11 for a vehicle security control. The security ECU 11 is installed in a vehicle and connected to transmitters 20, 21 and a receiver 22 for communication with an electronic key (transponder) 23 carried by a vehicle user. The security ECU 11 executes an electronic key check operation by the wireless communication with the electronic key 23 in both instances that the user having the electronic key 23 is outside and inside the vehicle.

The transmitter 20 includes an antenna mounted on a door or a rear trunk gate of the vehicle to transmit a radio signal toward the outside of the vehicle. The transmitter 21 includes two antennas mounted within a vehicle compartment to transmit radio signals in the compartment. The antennas of the transmitter 21 are located at the front side and the rear side of the vehicle compartment to transmit the radio signals toward the front side compartment area and the rear side compartment area, respectively.

The security ECU 11 has a microcomputer 12, which includes a CPU 13 for controlling communication with the electronic key 23, a memory 14 for storing control data, and the like. The security ECU 11 is connected to an engine switch 28 installed in an instrument panel in the vehicle. The security ECU 11 executes an electronic key check (in-vehicle key check), when a vehicle user enters a vehicle and manipulates the engine switch 28.

The security ECU 11 is further connected to an ECU 24 for a steering lock/unlock control and an ECU 25 for a door lock/unlock control. The door ECU 25 is connected to door switches 26, which detect opening/closing of vehicle doors. The door ECU 25 is further connected to a trigger switch 27, which is manipulated by a vehicle user when the electronic key check operation is required. The output signals of those switches 26, 27 are applied to the security ECU 11 through the door ECU 25.

The security ECU 11 applies a code information signal (1) to the transmitter 20 or 21, so that the transmitter 20 or 21 transmits a radio signal (2) as a request signal to start the in-vehicle key check operation. For instance, when the engine switch 28 is manipulated by a vehicle user, the security ECU 11 applies the code information signal (1) to the transmitter 21 and the transmitter 21 transmits the radio signal within the vehicle for the in-vehicle key check operation.

The electronic key 23 transmits in return a radio signal (3) as a response signal upon receiving the request signal from the transmitter 20 or 21. The receiver 22 applies a received response signal (4) to the security ECU 11 after shaping the waveform of the response signal (3). The security ECU 11 executes the in-vehicle key check on the received response signal to determine whether the electronic key 23 is an authorized one, and then executes a door open/close control or an engine start enable/disable control in a predetermined manner based on the check result.

Figure 2:
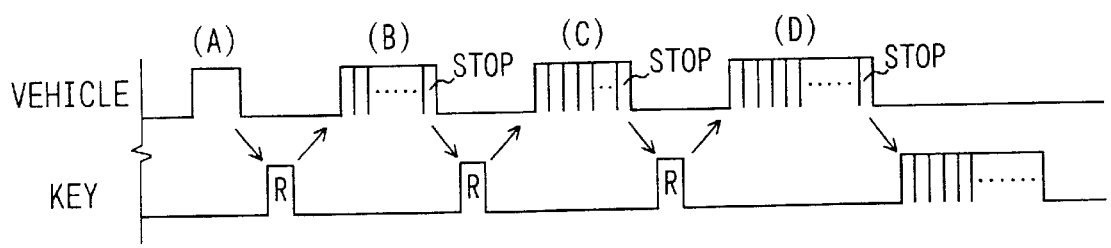
FIG. 2 is a time diagram showing signal communication between an electronic key and an in-vehicle electronic control unit in the embodiment.

The radio signal communication between the security ECU 11 (vehicle side) and the electronic key 23 are performed as shown in FIG. 2. This communication is performed in time-divided manner, that is, in four time stages (A) to (D) for improved security.

In the first time stage (A), the security ECU 11 transmits an electronic key activation signal. When the electronic key 23 is within a specified area outside the vehicle, the electronic key 23 transmits the response signal R and the presence of the electronic key 23 is confirmed by the vehicle side based on the reception of the response signal at the vehicle side.

In the second time stage (B), the security ECU 11 transmits a vehicle code signal. This signal includes a vehicle code pre-stored in the security ECU 11 and assigned to each vehicle to differ from vehicle to vehicle. The electronic key 23 checks whether the received vehicle code is in agreement with a vehicle code pre-stored in the electronic key 23. If both vehicle codes agree, the electronic key 23 transmits a response signal R indicating the vehicle code agreement.

In the third time stage (C), the security ECU 11 transmits a key code signal. This signal includes a key code pre-stored in the security ECU 11 and assigned to each electronic key to differ from key to key. A plurality of key codes are stored in the security ECU 11 and the key codes are transmitted in sequence for each pre-stored code, because a plurality of keys are assigned to each vehicle. The electronic key 23 checks whether any of the received key codes is in agreement with a key code pre-stored in the electronic key 23. If both key codes agree, the electronic key transmits a response signal R indicating the key code agreement.

In the fourth time stage (D), the security ECU 11 transmits a random number code signal. The electronic key 23 encrypts the received random number code and transmits a response signal including the encrypted code. The security ECU 11 decrypts the received code and checks whether the decrypted code is correct. If the decrypted code is correct, the security ECU 11 determines that the electronic key 23 is an authorized one, that is, the electronic key 23 has already been registered in correspondence with the security ECU 11.

One cycle of the above sequence of communication takes about several hundred milliseconds. It is possible to immediately stop, when no response signal is received from the electronic key 23, subsequent signal transmission operation of the security ECU 11.

Figure 3:
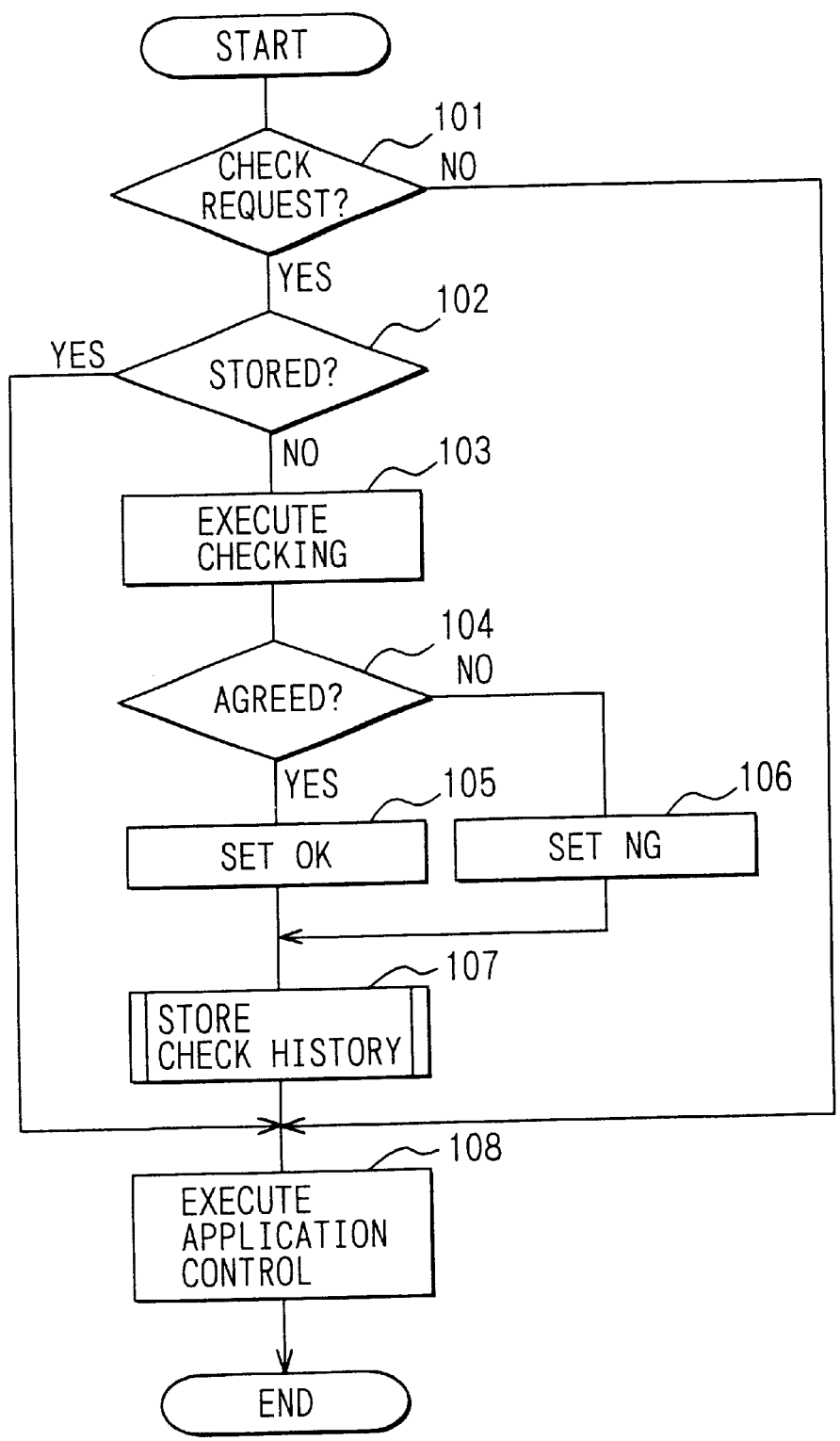
FIG. 3 is a flow diagram showing a part of an electronic key check operation executed by the in-vehicle electronic control unit in the embodiment.
Figure 4:
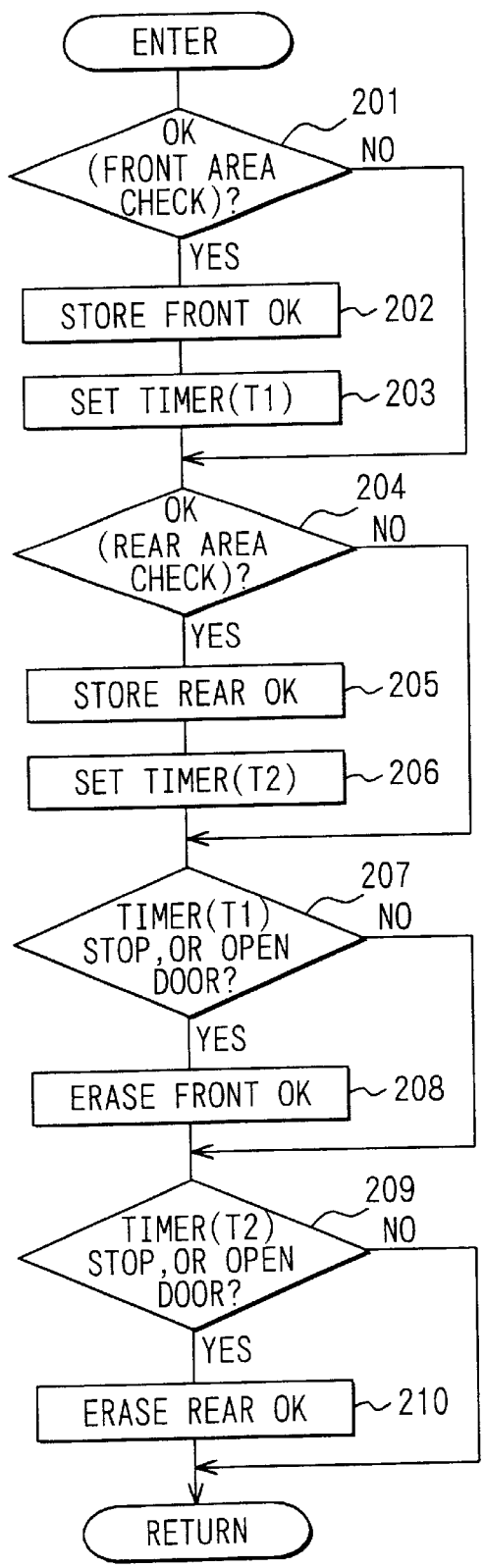
FIG. 4 is a flow diagram showing another part of the electronic key check operation executed by the in-vehicle electronic control unit in the embodiment.

The security ECU 11, specifically the microcomputer 13, is programmed to execute the in-vehicle key check operation as shown in FIGS. 3 and 4 at a predetermined time interval, whether a user carrying the electronic key 23 enters a vehicle or not.

First at step 101, the ECU 11 checks whether the in-vehicle check is requested. The ECU 11 determines that the in-vehicle check is requested when the engine switch 28 is manipulated, or when the elapse of time is within a predetermined period (for instance, 30 seconds) from the door opening/closing detected by the door switch 26.

If the in-vehicle check is requested, the ECU 11 checks at step 102 whether a previous check history indicating that the electronic key 23 is an authorized one is stored in the memory 14. If the check history is not stored, the ECU 11 executes check processing at step 103. In this processing, the ECU 11 communicates with the electronic key 23 in the same manner (in four time stages) as shown in FIG. 2. Because front and rear communication areas are defined in a vehicle in this embodiment, the in-vehicle check is executed for each communication areas.

The ECU 11 checks at step 104 whether the electronic key 23 is an authorized one for the vehicle. If it is the authorized one, the ECU 11 set an OK flag at step 105. If it is not, the ECU 11 sets a NG flag at step 106. The ECU 11 stores the result (OK or NG) of the above processing in the memory 14 as a history of the in-vehicle check at step 107.

If the previous check history is stored in the memory 14 (YES at step 102), the processing jumps to step 108. The ECU 11 executes an application control such as a steering lock/unlock control, door lock/unlock control or engine start enable/disable control in correspondence with the stored OK flag and NG flag.

The ECU 11 executes the check history storing step 107 as shown in FIG. 4.

The ECU 11 checks at step 201 whether the electronic key 23 is determined to be an authorized one (OK) by the communication in the front area of the compartment. The ECU 11 stores a front OK flag in the memory 14 at step 202 as a check history in the front area, if the electronic key 23 is the authorized one. The ECU 11 then sets a predetermined storage period T2 for storing this check history (for instance, several seconds) in a timer at step 203.

The ECU 11 checks at step 204 whether the electronic key 23 is determined to be an authorized one (OK) by the communication in the rear area of the compartment. The ECU 11 stores a rear OK flag in the memory 14 at step 205 as a check history in the rear area, if the electronic key 23 is the authorized one. The ECU 11 then sets a predetermined storage period T2 for storing this check history (for instance, several seconds) in a timer at step 206. The check result history stored in the memory 14 at step 202 or 205 is retrieved at step 102 as a previous check result.

The ECU 11 checks at step 207 whether the timer has stopped due to an elapse of the predetermined period T1, or whether the vehicle door is opened. Opening of the door indicates possibility that the electronic key 23 will be taken out from the vehicle. It is also possible to detect this possibility by detecting opening of a door window. If the check result at step 207 is YES, the front OK flag is erased from the memory 14 at step 208.

The ECU 11 checks at step 209 whether the timer has stopped due to an elapse of the predetermined period T2, or whether the vehicle door is opened. Opening of the door or the door window indicates possibility that the electronic key 23 will be taken out from the vehicle. If the check result at step 209 is YES, the rear OK flag is erased from the memory 14 at step 210.

Figure 5:
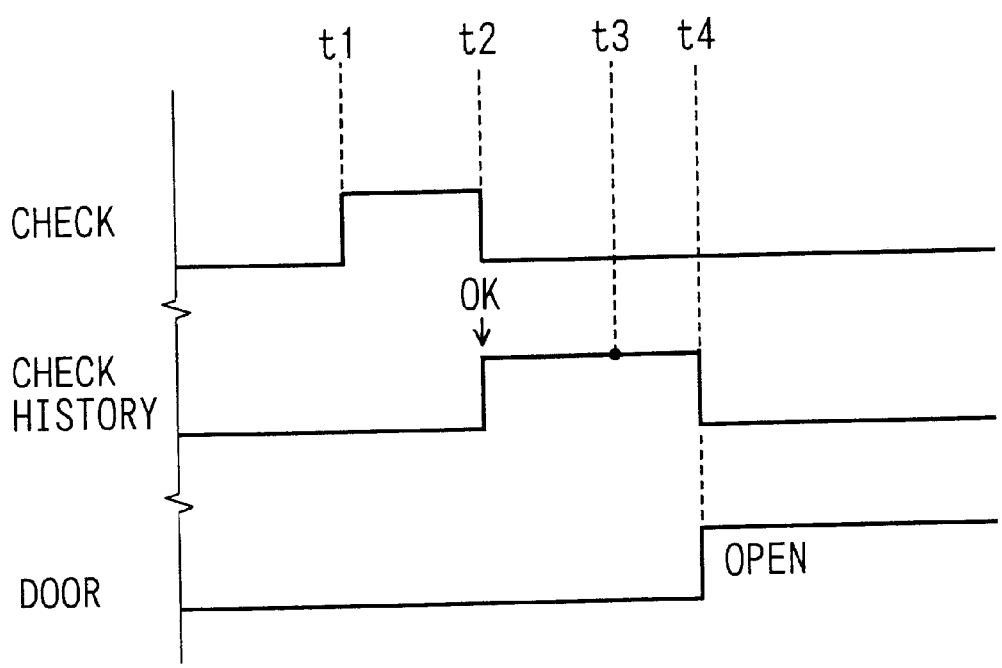
FIG. 5 is a time diagram showing an electronic key check operation executed by the in-vehicle electronic control unit in the embodiment.

The operation of the embodiment is shown in FIG. 5. At time t1, an in-vehicle key check condition is satisfied and the key check operation is executed thereafter. If the electronic key 23 is determined to be an authorized one, the OK flag is stored in the memory 14 at time t2. When another in-vehicle key check condition is satisfied at time t3, the previous check history is referred to, thus eliminating a repetition of the check operation. When a vehicle door is opened at time t4 or the predetermined period T1 (T2) elapses, the stored check history is erased. If a further check condition is satisfied after time t4, the electronic key check is executed in the similar manner as above.

The above embodiment provides the following advantages.

The in-vehicle key check operation is not executed repeatedly, if the electronic key 23 has already been determined to be an authorized one previously. The in-vehicle key check operation is not executed repeatedly for each of requests made by the door switch 26, the trigger switch 27 and the engine switch 28, when the requests are made within a short period of time. Thus, the key check operation time and processing are minimized. This is particularly advantageous in the case that the key check operation is divided into a plurality of time stages (A) to (D).

The key check history stored in the memory 14 as a result of the first time key check operation is erased, when it is likely that the electronic key 23 will be taken out from the vehicle or when the predetermined time T1 (T2) elapses from the key check operation. The in-vehicle key check operation is not limited so much, thus maintaining reliability of the key check operation.

The present invention should not be limited to the disclosed embodiment, but may be modified in various ways without departing from the spirit of the invention.

What is claimed is:

1. An in-vehicle check system for a vehicle comprising:
   a portable transponder for receiving and transmitting wireless signals;
   a transmitter installed in a vehicle for transmitting a wireless signal in a vehicle compartment;
   a receiver installed in the vehicle for receiving the wireless signal from the portable transponder; and
   an electronic unit installed in the vehicle for checking whether the portable transponder is an authorized one based on the wireless signal received by the receiver, wherein the electronic unit includes:
      a memory for storing a check result indicating that the portable transponder is the authorized one; and
      a check means for checking the memory for the check result and eliminating another check operation when the check result is stored in the memory, the check means further for checking the memory for the check result each time a predetermined in-vehicle check condition is satisfied.

2. An in-vehicle check system as in claim 1, wherein the electronic unit further includes an erasing means for erasing the check result stored in the memory when a predetermined condition indicating a possibility of taking out the portable transponder from the vehicle is detected.

3. An in-vehicle check system as in claim 1, wherein the electronic unit further includes an erasing means for erasing the check result stored in the memory when a predetermined time elapses after the check result is stored in the memory.

4. An in-vehicle check system as in claim 1, wherein the electronic unit communicates with the portable transponder through the wireless signals in a plurality of time-divided stages to complete one cycle of its checking operation.

5. An in-vehicle key check method for an electronic key system having an electronic key carried by a user and an electronic unit installed in a vehicle, the method comprising steps of:
   transmitting a wireless signal in a vehicle compartment from the electronic unit when a predetermined check condition occurs in the vehicle;
   receiving a wireless signal generated from the electronic key in response to the wireless signal from the electronic unit;
   checking whether the electronic key is an authorized one based on the wireless signal from the electronic key;
   storing a check result in a memory of the electronic unit, the check result indicating that the electronic key is the authorized one;
   referring to the memory for the check result when another predetermined check condition occurs in the vehicle; and
   skipping a repetition of the steps of transmitting, receiving and checking when the check result is held stored in the memory.

6. An in-vehicle key check method as in claim 5, further comprising a step of:
   erasing the check result stored in the memory when a vehicle door is opened after the check result is stored.

7. An in-vehicle key check method as in claim 5, further comprising a step of:
   erasing the check result stored in the memory when a predetermined time elapses after the check result is stored.

8. An in-vehicle key check method as in claim 5, wherein the steps of transmitting and receiving are repeated a plurality of times in a time-divided manner to complete one cycle of communication of data required to perform the step of checking the electronic key.

9. An in-vehicle key check method as in claim 5, wherein the steps of transmitting, receiving and checking are performed in a front side area and a rear side area in the vehicle compartment separately from each other.

10. An in-vehicle check system for a vehicle comprising:
   a portable transponder for receiving and transmitting wireless signals;
   a transmitter installed in a vehicle for transmitting a wireless signal in a vehicle compartment;
   a receiver installed in the vehicle for receiving the wireless signal from the portable transponder; and
   an electronic unit installed in the vehicle for checking whether the portable transponder is authorized one based on the wireless signal received by the receiver, wherein the electronic unit includes:
- a memory for storing a check result indicating that the portable transponder is the authorized one;
- a check means for checking the memory for the check result and eliminating another check operation when the check result is stored in the memory; and
- an erasing means for erasing the check result stored in the memory when a predetermined condition indicating a possibility of taking out the portable transponder from the vehicle is detected.

11. An in-vehicle check system as in claim 10, wherein the electronic unit communicates with the portable transponder through the wireless signals in a plurality of time-divided stages to complete on cycle of its checking operation.

* * * * *

UNITED STATES PATENT AND TRADEMARK OFFICE
CERTIFICATE OF CORRECTION

PATENT NO.   : 6,580,181 B2
DATED        : June 17, 2003
INVENTOR(S)  : Tatsuya Katou and Toshihiro Wakamatsu It is certified that error appears in the above-identified patent and that said Letters Patent is hereby corrected as shown below:

<u>Title page,</u>
Item [12], correct the first inventor's name "Nagoya et al." to be -- Katou et al. --
Item [75], correct the first inventor's name "Tatsuya Wakamatsu Nagoya" to be
-- Tatsuya Katou --

Signed and Sealed this

Twenty-first Day of October, 2003

JAMES E. ROGAN
*Director of the United States Patent and Trademark Office*